US012738160B2

(12) United States Patent
Lee et al.

(10) Patent No.: US 12,738,160 B2
(45) Date of Patent: Sep. 15, 2026

(54) EMERGENCY VEHICLE DETECTION METHOD AND DEVICE

(71) Applicants: HYUNDAI MOTOR COMPANY, Seoul (KR); KIA CORPORATION, Seoul (KR)

(72) Inventors: Jung Hyun Lee, Seoul (KR); Sun Phill Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 125 days.

(21) Appl. No.: 18/737,205

(22) Filed: Jun. 7, 2024

(65) Prior Publication Data

US 2025/0218289 A1 Jul. 3, 2025

(30) Foreign Application Priority Data

Dec. 27, 2023 (KR) ........................ 10-2023-0193510

(51) Int. Cl.
*G08G 1/0965* (2006.01)
*A61G 3/00* (2006.01)

(52) U.S. Cl.
CPC ............ *G08G 1/0965* (2013.01); *A61G 3/00* (2013.01)

(58) Field of Classification Search
CPC .. G08G 1/0965; G08G 1/0112; G08G 1/0133; G08G 1/0137; A61G 3/00;
(Continued)

(56) References Cited

U.S. PATENT DOCUMENTS 12,396,437 B1 * 8/2025 Shafer .................. A01K 11/006
12,437,554 B2 * 10/2025 Das ........................... G01S 5/18
(Continued)

FOREIGN PATENT DOCUMENTS

DE 102020129425 A1 * 5/2021 ............. G06N 3/045

OTHER PUBLICATIONS

European Search Report cited in the European patent application No. 24210845.4; Apr. 23, 2025; pp. 1-17.
(Continued)

*Primary Examiner* — Rufus C Point
(74) *Attorney, Agent, or Firm* — Lempia Summerfield Katz LLC

(57) ABSTRACT

An emergency vehicle detection method includes acquiring, by an acquisition device, sounds of external vehicles including an emergency vehicle and a general vehicle; generating, by a generator, a first spectrogram for an emergency vehicle sound and a second spectrogram for a general vehicle sound; generating, by the generator, first emergency vehicle location information based on the first spectrogram; generating, by the generator, general vehicle location information based on the second spectrogram; acquiring, by the acquisition device, images of the external vehicles; generating, by the generator, second emergency vehicle location information based on the images of the external vehicles; and detecting, by a detector, a location of the emergency vehicle based on a correlation of at least two of the first emergency vehicle location information, the general vehicle location information, or the second emergency vehicle location information.

20 Claims, 15 Drawing Sheets

(58) Field of Classification Search
CPC ............ G06N 3/045; G06N 3/08; G06N 3/02; G06N 3/0895; G06V 20/58; G06V 10/82; G01S 2205/01; G01S 2205/06; G01S 5/18; G01S 5/16
See application file for complete search history.

(56) References Cited

U.S. PATENT DOCUMENTS

| | | | | |
|---|---|---|---|---|
| 2014/0049420 | A1* | 2/2014 | Lehning | G08G 1/015 342/109 |
| 2018/0358033 | A1* | 12/2018 | Yu | G06F 16/686 |
| 2020/0379108 | A1* | 12/2020 | Vijayalingam | G06V 20/58 |
| 2023/0063047 | A1* | 3/2023 | Schmitt | G05D 1/0287 |
| 2023/0128993 | A1 | 4/2023 | Faubel et al. | |
| 2025/0111777 | A1* | 4/2025 | Furukawa | G16Y 20/20 |

OTHER PUBLICATIONS

Yury Furletov et al., Auditory Scene Understanding for Autonomous Driving; 2021 IEEE Intelligent Vehicles Symposium (IV); 2021; pp. 697-702.

* cited by examiner

EMERGENCY VEHICLE DETECTION METHOD AND DEVICE

CROSS-REFERENCE TO RELATED APPLICATION

This application claims the benefit of and priority to Korean Patent Application No. 10-2023-0193510, filed in the Korean Intellectual Property Office on Dec. 27, 2023, the entire contents of which are incorporated herein by reference.

TECHNICAL FIELD

The technical idea of the present disclosure relates to an object detection method and an object detection device, and more specifically, to an emergency vehicle detection method and an emergency vehicle detection device.

BACKGROUND

Recently, research is being conducted on various methods for detecting the location of an object. Methods for detecting the location of a specific vehicle are also being studied and, for example, methods for detecting emergency vehicles are being studied.

Methods for detecting an emergency vehicle include a method of detecting the location of an emergency vehicle based on the sound of a siren of the emergency vehicle and include a method of detecting the location of the emergency vehicle based on an image of the emergency vehicle. However, if an emergency vehicle is detected based on sound, the accuracy of detecting the location of a vehicle may decrease due to latency issues. If the location of an emergency vehicle is detected based on an image, the accuracy of detecting whether there is the emergency vehicle may decrease. Therefore, there may be a need for a method of accurately detecting the location of an emergency vehicle by detecting the emergency vehicle based on both sound and image. The subject matter described in this background section is intended to promote an understanding of the background of the disclosure and thus may include subject matter that is not already known to those of ordinary skill in the art.

SUMMARY

The present disclosure has been made to solve the above-mentioned problems occurring in the prior art while advantages achieved by the prior art are maintained intact.

Aspects of the present disclosure provide an object detection method and an object detection device that detect whether an external vehicle is an emergency vehicle based on sound and images.

Aspects of the present disclosure provide an object detection method and an object detection device that detect the location of an emergency vehicle based on sound and images.

Aspects of the present disclosure provide an object detection method and an object detection device that detect the location of an emergency vehicle by considering the correlation between at least two of the locations of external vehicles detected based on sound or the location of the emergency vehicle detected based on images.

Aspects of the present disclosure provide an object detection method and an object detection device that detect the location of an emergency vehicle through a neural network.

Aspects of the present disclosure provide an object detection method and an object detection device that improve the accuracy of detection of emergency vehicle location through self-supervised learning.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an emergency vehicle detection method includes acquiring, by an acquisition device, sounds of external vehicles including an emergency vehicle and a general vehicle. The method also includes generating, by a generator, a first spectrogram for an emergency vehicle sound and a second spectrogram for a general vehicle sound. The method also includes generating, by the generator, first emergency vehicle location information based on the first spectrogram. The method also includes generating, by the generator, general vehicle location information based on the second spectrogram. The method also includes acquiring, by the acquisition device, images of the external vehicles. The method also includes generating, by the generator, second emergency vehicle location information based on the images of the external vehicles. The method also includes detecting, by a detector, a location of the emergency vehicle based on a correlation of at least two of the first emergency vehicle location information, the general vehicle location information, or the second emergency vehicle location information.

According to an embodiment, generating the first spectrogram and the second spectrogram may include generating, by the generator, a third spectrogram for the sounds of the external vehicles. Generating the first spectrogram and the second spectrogram may also include generating, by the generator, a Fourier spectrum by performing a 2D Fast Fourier Transform (FFT) on the third spectrogram. Generating the first spectrogram and the second spectrogram may also include detecting, by the detector, a first spectrum corresponding to the emergency vehicle sound and a second spectrum corresponding to the general vehicle sound from the Fourier spectrum. Generating the first spectrogram and the second spectrogram may also include generating, by the generator, the first spectrogram and the second spectrogram by performing an inverse 2D FFT on each of the first spectrum and the second spectrum.

According to an embodiment, detecting the first spectrum and the second spectrum may include detecting, by the detector, the first spectrum from the Fourier spectrum by extracting patterns that include peak points and are repeated in a horizontal axis direction. Detecting the first spectrum and the second spectrum may also include detecting, by the detector, the second spectrum by filtering out the first spectrum from the Fourier spectrum.

According to an embodiment, generating the first spectrogram and the second spectrogram may include generating, by the generator, the first spectrogram and the second spectrogram by detecting the emergency vehicle sound and the general vehicle sound from the sounds of the external vehicles through a neural network that separates sounds.

According to an embodiment, generating the first emergency vehicle location information may include generating, by the generator, the first emergency vehicle location information based on the first spectrogram through a neural network that detects a location of an object based on a spectrogram.

According to an embodiment, the first emergency vehicle location information may include information about a first Gaussian function corresponding to the location of the emergency vehicle. The general vehicle location information may include information about a second Gaussian function corresponding to a location of the general vehicle. The second emergency vehicle location information may include information about a third Gaussian function corresponding to the location of the emergency vehicle.

According to an embodiment, the first Gaussian function may be a 2D Gaussian function with a positive output value. The second Gaussian function may be a 2D Gaussian function with a negative output value. The third Gaussian function may be a 2D Gaussian function with a positive output value.

According to an embodiment, detecting the location of the general vehicle may include extracting, by an extractor, a fourth Gaussian function whose degree of correlation with at least one of the first Gaussian function or the second Gaussian function is greater than a threshold value, from among the third Gaussian functions. Detecting the location of the general vehicle may also include detecting, by the detector, the location of the emergency vehicle by determining a location of a vehicle corresponding to the fourth Gaussian function as the location of the emergency vehicle.

According to an embodiment, generating the first emergency vehicle location information may include generating, by the generator, the first emergency vehicle location information based on the first spectrogram through a neural network that detects a location of an object based on a spectrogram. Generating the first emergency vehicle location information may also include performing, by a learning device, self-supervised learning on the neural network by using the location of the vehicle corresponding to the fourth Gaussian function as GT (Ground Truth) for the location of the emergency vehicle.

According to an embodiment, generating the second emergency vehicle location information may include generating, by the generator, the second emergency vehicle location information based on the images of the external vehicles by a neural network that detects a location of an object based on an image.

According to an aspect of the present disclosure, an emergency vehicle detection device includes a memory that stores computer-executable instructions and includes at least one processor configured to access the memory and execute the instructions. The at least one processor acquires, by an acquisition device, sounds of external vehicles including an emergency vehicle and a general vehicle, and images of the external vehicles. The at least one processor generates, by a generator, a first spectrogram for an emergency vehicle sound and a second spectrogram for a general vehicle sound. The at least one processor by the generator, first emergency vehicle location information based on the first spectrogram. The at least one processor generates, by the generator, general vehicle location information based on the second spectrogram. The at least one processor generates, by the generator, second emergency vehicle location information based on the images of the external vehicles. The at least one processor detects, by a detector, a location of the emergency vehicle based on a correlation of at least two of the first emergency vehicle location information, the general vehicle location information, or the second emergency vehicle location information.

According to an embodiment, the at least one processor may generate, by the generator, a third spectrogram for the sounds of the external vehicles. The at least one processor may also generate, by the generator, a Fourier spectrum by performing a 2D Fast Fourier Transform (FFT) on the third spectrogram. The at least one processor may also detect, by the detector, a first spectrum corresponding to the emergency vehicle sound and a second spectrum corresponding to the general vehicle sound from the Fourier spectrum. The at least one processor may also generate, by the generator, the first spectrogram and the second spectrogram by performing an inverse 2D FFT on each of the first spectrum and the second spectrum.

According to an embodiment, the at least one processor may detect, by the detector, the first spectrum from the Fourier spectrum by extracting patterns that include peak points and are repeated in a horizontal axis direction and detect the second spectrum by filtering out the first spectrum from the Fourier spectrum.

According to an embodiment, the at least one processor may generate, by the generator, the first spectrogram and the second spectrogram by detecting the emergency vehicle sound and the general vehicle sound from the sounds of the external vehicles by using a neural network that separates sounds.

According to an embodiment, the at least one processor may generate, by the generator, the first emergency vehicle location information corresponding to the location of the emergency vehicle based on the first spectrogram by using a neural network that detects a location of an object based on a spectrogram.

According to an embodiment, the first emergency vehicle location information may include information about a first Gaussian function corresponding to the location of the emergency vehicle. The general vehicle location information may include information about a second Gaussian function corresponding to a location of the general vehicle. The second emergency vehicle location information may include information about a third Gaussian function corresponding to the location of the emergency vehicle.

According to an embodiment, the first Gaussian function may be a 2D Gaussian function with a positive output value. The second Gaussian function may be a 2D Gaussian function with a negative output value. The third Gaussian function may be a 2D Gaussian function with a positive output value.

According to an embodiment, the at least one processor may extract, by an extractor, a fourth Gaussian function whose degree of correlation with at least one of the first Gaussian function or the second Gaussian function is greater than a threshold value, from among the third Gaussian functions. The at least one processor may also detect, by the detector, the location of the emergency vehicle by determining a location of a vehicle corresponding to the fourth Gaussian function as the location of the emergency vehicle.

According to an embodiment, the at least one processor may generate, by the generator, the first emergency vehicle location information based on the first spectrogram by using a neural network that detects a location of an object based on a spectrogram. The at least one processor may also perform, by a learning device, self-supervised learning on the neural network by using the location of the vehicle corresponding to the fourth Gaussian function as GT (Ground Truth) for the location of the emergency vehicle.

According to an embodiment, the at least one processor may generate, by the generator, the second emergency vehicle location information based on the images of the external vehicles by using a neural network that detects a location of an object based on an image.

The features briefly summarized above with respect to the present disclosure are merely illustrative aspects of the detailed description of the present disclosure described below, and do not limit the scope of the present disclosure.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
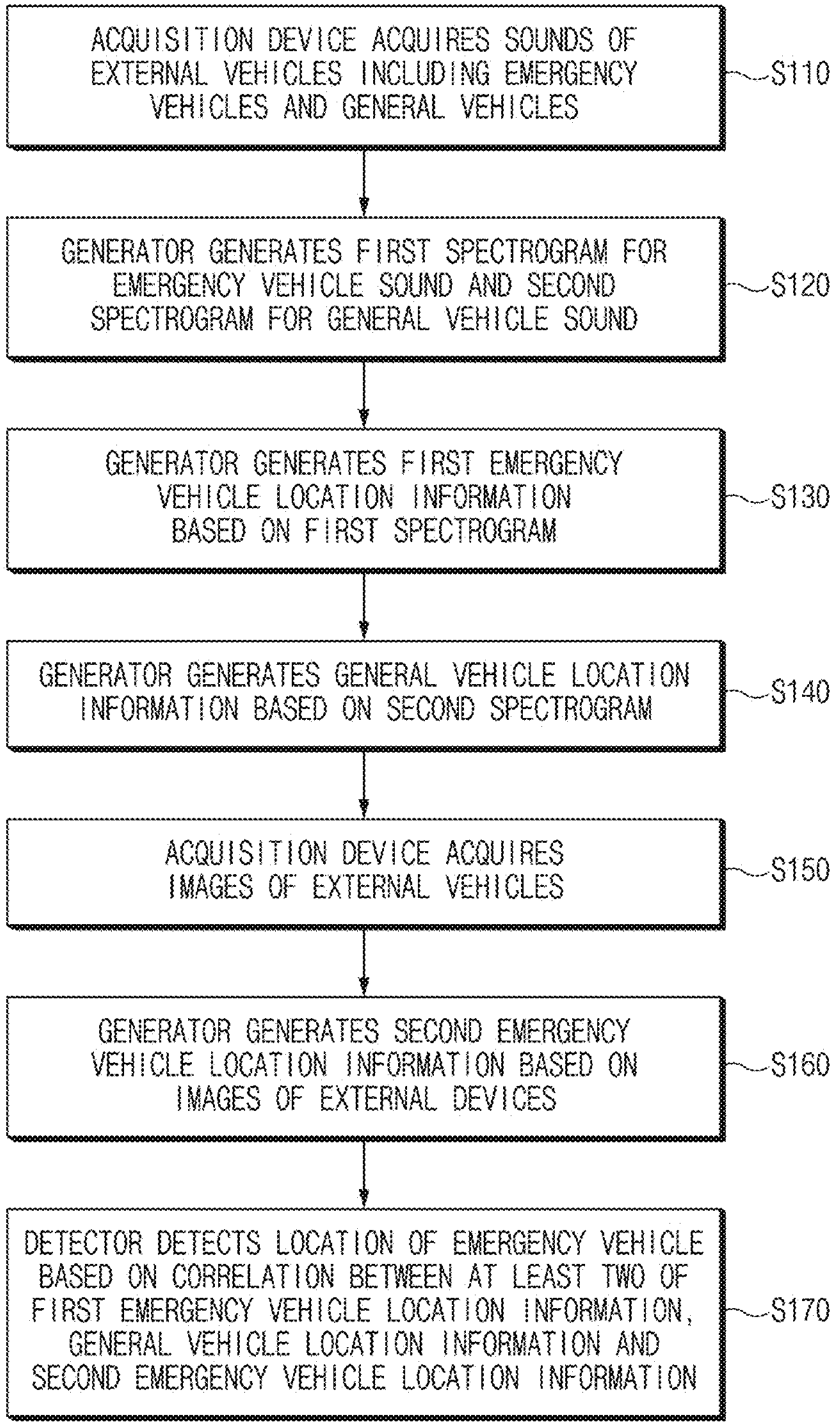
FIG. 1 is a flowchart showing an emergency vehicle detection method according to an embodiment of the present disclosure.

Hereinafter, with reference to the accompanying drawings, embodiments of the present disclosure are described in detail such that those of ordinary skill in the art may carry out the present disclosure. However, the present disclosure may be embodied in many different forms and should not be construed as limited to the embodiments set forth herein.

Further, in describing the embodiment of the present disclosure, a detailed description of well-known features or functions has been omitted in order not to unnecessarily obscure the gist of the present disclosure. In the drawings, parts not related to the description have been omitted, and like reference numerals refer to like elements throughout the present disclosure.

In the present disclosure, it should be understood that when an element is referred to as being "connected to", "coupled to", or "combined with" another element, the element may be directly connected or coupled to or combined with the other element or intervening elements may be present therebetween. It should be further understood that the terms "comprise", "include" or "have" and variations thereof, when used in the present disclosure, specify the presence of stated elements but do not preclude the presence or addition of one or more other elements.

In the present disclosure, terms such as first and second are used only for the purpose of distinguishing one element from other elements and do not limit the order or importance of the elements unless specifically mentioned. Accordingly, within the scope of the present disclosure, a first element in one embodiment may be referred to as a second element in another embodiment, and similarly, the second element in one embodiment may be referred to as a first element in another embodiment.

In the present disclosure, distinct elements are only for clearly describing their features and do not necessarily mean that the elements are separated. In other words, a plurality of elements may be integrated to form a single hardware or software unit, or a single element may be distributed to form a plurality of hardware or software units. Accordingly, such integrated or distributed embodiments are included in the scope of the present disclosure, even if not otherwise noted.

In the present disclosure, elements described in the various embodiments are not necessarily essential elements, and some elements may be optional. Accordingly, embodiments including a subset of the elements described in one embodiment are also included in the scope of the present disclosure. Additionally, embodiments that include other elements in addition to elements described in the various embodiments are also included in the scope of the present disclosure.

In the present disclosure, expressions of positional relationships used in the present disclosure, such as top, bottom, left, or right, are described for convenience of description, and when the drawings are viewed in reverse, the positional relationships described in the present disclosure may also be interpreted in the opposite way.

In the present disclosure, each of the phrases "A or B," "at least one of A and B," "at least one of A or B," "A, B or C," "at least one of A, B and C," "at least one or more of A, B, or C," and "at least one of A, B, or C" may include any one of items listed along with a relevant phrase, or any possible combination thereof. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Hereinafter, embodiments of the present disclosure are described in detail with reference to FIGS. 1-15.

FIG. 1 is a flowchart showing an emergency vehicle detection method according to an embodiment of the present disclosure.

Methods of detecting an emergency vehicle may include a method of detecting a location of an emergency vehicle based on the sound of the emergency vehicle (for example, a repeated siren sound), a method of detecting a location of an emergency vehicle based on the image of the emergency vehicle, and the like. If the location of an emergency vehicle is detected based on the sound of the emergency vehicle, a latency issue may occur because the location of the emergency vehicle is detected by analyzing sound data for each movement section of the vehicle in chronological order. Therefore, if the location of an emergency vehicle is detected based on the sound of the emergency vehicle, an error may occur in detecting the location of the emergency vehicle. In addition, if the location of an emergency vehicle is detected based on the image of an emergency vehicle, an error occurs in detecting the location of a general vehicle rather than an emergency vehicle. For example, because the positions of warning lights included in emergency vehicles are different, it may be difficult to extract the feature of an emergency vehicle from images of external vehicles. Therefore, if the location of an emergency vehicle is detected based on images of external vehicles, the location may be detected more accurately than if the emergency vehicle is detected based on the sounds of external vehicles. However, an error may also occur in which the location of a general vehicle is detected rather than the emergency vehicle. Therefore, an emergency vehicle detection method, which accurately detects the location of the emergency vehicle based on both sound and image may be needed. An emergency vehicle detection method according to an embodiment of the present disclosure may accurately detect the location of the emergency vehicle based on the sounds of external vehicles and images of external vehicles.

Referring to FIG. 1, according to an emergency vehicle detection method according to an embodiment of the present disclosure, in S110, an acquisition device may acquire sounds of external vehicles including emergency vehicles and general vehicles.

According to the emergency vehicle detection method, in S120, a generator may generate a first spectrogram for emergency vehicle sounds and a second spectrogram for general vehicle sounds. For example, the emergency vehicle detection method may include separating the acquired sounds of external vehicles into emergency vehicle sounds and general vehicle sounds. The emergency vehicle detection method may also include generating a first spectrogram for emergency vehicle sounds and a second spectrogram for general vehicle sounds. More specific details on generating a first spectrogram for emergency vehicle sounds and a second spectrogram for general vehicle sounds based on the sounds of external vehicles are described below.

According to the emergency vehicle detection method, in S130, the generator may generate first emergency vehicle location information based on the first spectrogram. Specifically, the emergency vehicle detection method may include generating a first Gaussian function corresponding to the location of the emergency vehicle based on the first spectrogram. For example, the emergency vehicle detection method may include generating the first Gaussian function corresponding to the location of the emergency vehicle based on the first spectrogram by using a neural network that detects the location of an object based on a spectrogram.

According to the emergency vehicle detection method, in S140, the generator may generate general vehicle location information based on the second spectrogram. Specifically, the emergency vehicle detection method may include generating a second Gaussian function corresponding to the location of the general vehicle based on the second spectrogram. For example, the emergency vehicle detection method may include generating the second Gaussian function corresponding to the location of the emergency vehicle based on the second spectrogram by using a neural network that detects the location of an object based on a spectrogram.

According to the emergency vehicle detection method, in S150, the acquisition device may acquire images of external vehicles. In other words, the emergency vehicle detection method may include acquiring sounds of the external vehicles and images of the external vehicles.

According to the emergency vehicle detection method, in S160, the generator may generate second emergency vehicle location information based on the images of external vehicles. Specifically, vehicle detection method may include generating a third Gaussian function corresponding to the location of the emergency vehicle based on the images of the external vehicles. For example, the emergency vehicle detection method may include generating the third Gaussian function corresponding to the location of the emergency vehicle based on the images of the external vehicles through a neural network that detects the location of an object based on an image.

The first emergency vehicle location information may include information about the first Gaussian function corresponding to the location of the emergency vehicle. In addition, the general vehicle location information may include information about the second Gaussian function corresponding to the location of the general vehicle. In addition, the second emergency vehicle location information may include information about the third Gaussian function corresponding to the location of the emergency vehicle.

The first Gaussian function may be a 2D Gaussian function with a positive output value, the second Gaussian function may be a 2D Gaussian function with a negative output value, and the third Gaussian function may be a 2D Gaussian function with a positive output value. On the other hand, the first Gaussian function may be a 2D Gaussian function with a negative output value, the second Gaussian function may be a 2D Gaussian function with a positive output value, and the third Gaussian function may be a 2D Gaussian function with a negative output value.

According to the emergency vehicle detection method, in S170, a detector may detect the location of the emergency vehicle based on a correlation between at least two of the first emergency vehicle location information, the general vehicle location information, or the second emergency vehicle location information. Specifically, the emergency vehicle detection method may include detecting the location of the emergency vehicle based on at least one of the correlation between the first Gaussian function and the third Gaussian function or the correlation between the second Gaussian function and the third Gaussian function. For example, the emergency vehicle detection method may include extracting, from the third Gaussian function, a fourth Gaussian function whose value of a correlation with at least one of the first Gaussian function or the second Gaussian function is greater than a threshold value from the third Gaussian function. The emergency vehicle detection method may include detecting the location of the emergency vehicle by determining the location of a vehicle corresponding to the fourth Gaussian function as the location of the emergency vehicle. More specific details regarding the correlation between at least two of the first Gaussian function, the second Gaussian function, or the third Gaussian function are described below.

Figure 2:
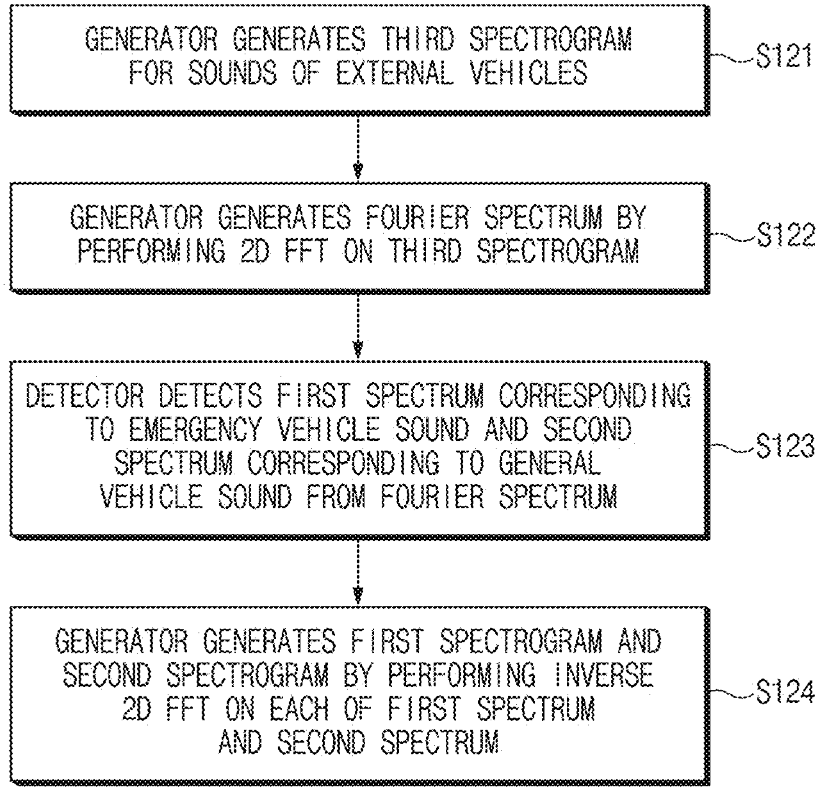
FIG. 2 is a flowchart showing an emergency vehicle detection method according to an embodiment of the present disclosure.
Figure 3:
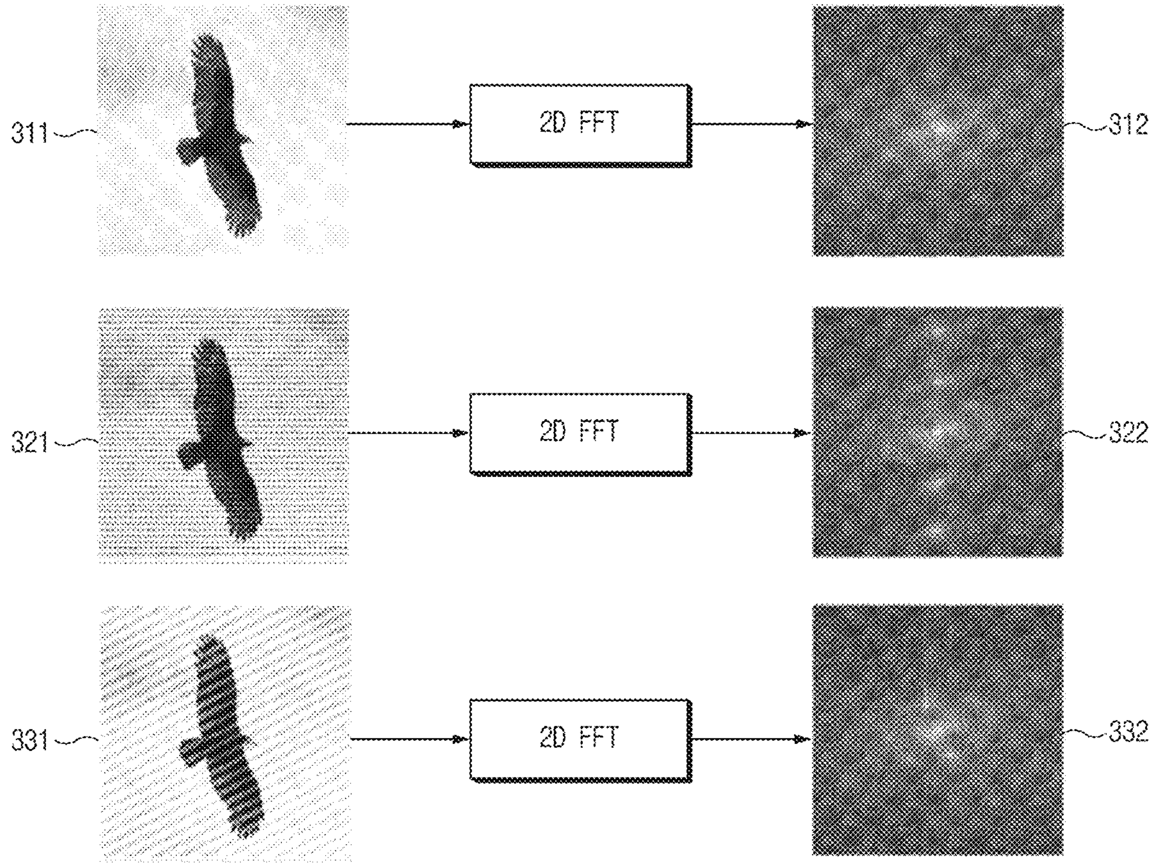
FIG. 3 is a diagram for describing an emergency vehicle detection method according to an embodiment of the present disclosure.
Figure 4:
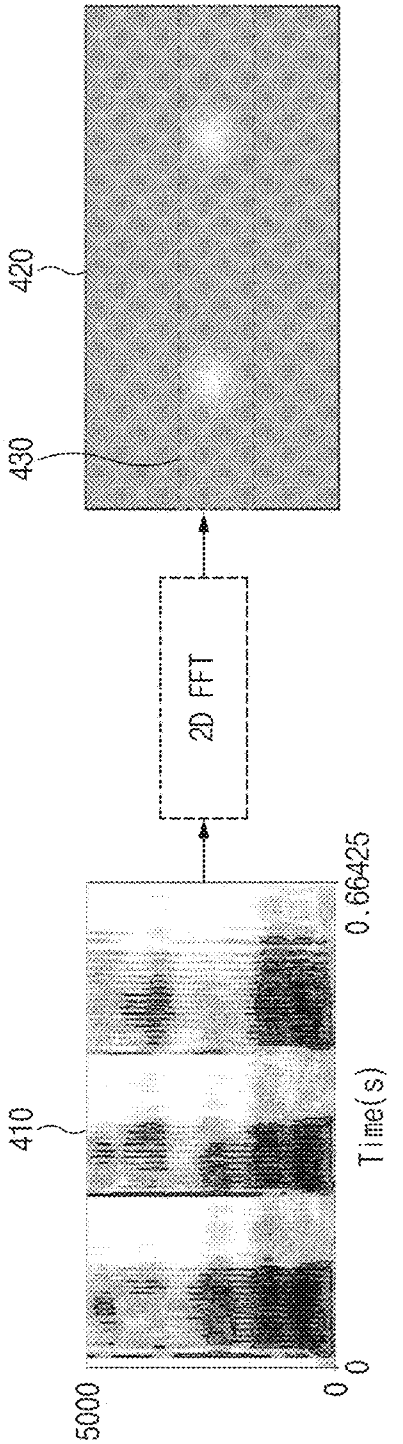
FIG. 4 is a diagram for describing an emergency vehicle detection method according to an embodiment of the present disclosure.

FIG. 2 is a flowchart showing an emergency vehicle detection method according to an embodiment of the present disclosure. FIG. 2 may be a flowchart of a more detailed method of S120 of FIG. 1. FIG. 3 is a diagram for describing an emergency vehicle detection method according to an embodiment of the present disclosure. FIG. 4 is a diagram for describing an emergency vehicle detection method according to an embodiment of the present disclosure. Hereinafter, FIG. 2 is described with reference to FIGS. 3 and 4.

Referring to FIG. 2, according to an emergency vehicle detection method, in S121, a generator may generate a third spectrogram for sounds of external vehicles. For example, referring to FIG. 4, a spectrogram 410 may be a spectrogram of sounds of the external vehicles, including emergency vehicles and general vehicles. Specifically, a repeating pattern in the spectrogram 410 may be the pattern of a spectrogram corresponding to the sound repeated by the siren of an emergency vehicle.

According to the emergency vehicle detection method, in S122, the generator may generate a Fourier spectrum by performing a 2D Fast Fourier Transform (FFT) on the third spectrogram. For example, because the third spectrogram contains a spectrogram for a sound repeated by the siren of an emergency vehicle, if a 2D FFT is performed on the third spectrogram, a Fourier spectrum with the repeating pattern 430 may generated. For example, referring to FIG. 3, if a 2D FFT is performed on images 311, 321, and 331, Fourier spectra 312, 322, and 332 may be generated. Specifically, it may be seen that if a 2D FFT is performed on the image 311 that does not contain a repeating pattern, a repeating pattern is not generated in the Fourier spectrum 312. It should be noted that, if a 2D FFT is performed on the image 321 in which a moire pattern on the horizontal axis is added to the image 311, the Fourier spectrum 322 in which repetitive patterns including a peak point are generated may be generated. Specifically, if a 2D FFT is performed on the image 321 to which a moire pattern in the horizontal direction is added, the Fourier spectrum 322 in which patterns including peak points in the vertical direction are repeated may be generated. Further, if a 2D FFT is performed on the image 331 to which a moire pattern in the diagonal direction is added, a Fourier spectrum 332 in which patterns including peak points in the diagonal direction are repeated may be generated. Therefore, if a 2D FFT is performed on the third spectrogram including a pattern such as moire in the vertical direction, such as the spectrogram 410, a Fourier spectrum (e.g., 420) in which patterns including peak points in the horizontal direction (e.g., 430) are repeated may be generated. In this case, the patterns 430 including peak points in the horizontal direction in the Fourier spectrum may be patterns generated by repeated sounds through the siren of an emergency vehicle.

According to the emergency vehicle detection method, in S123, the detector may detect a first spectrum corresponding to emergency vehicle sound and a second spectrum corresponding to general vehicle sound in the Fourier spectrum. Specifically, the emergency vehicle detection method may include detecting the first spectrum corresponding to the emergency vehicle sound by extracting patterns that include peak points and are repeated in the horizontal axis direction from the Fourier spectrum. In addition, the emergency vehicle detection method may include detecting the second spectrum corresponding to the general vehicle sound by filtering out the first spectrum in the Fourier spectrum.

According to the emergency vehicle detection method, in S124, the generator may generate a first spectrogram for the emergency vehicle sound and a second spectrogram for the general vehicle sound by performing an inverse 2D FFT on each of the first spectrum and the second spectrum.

Figure 5:
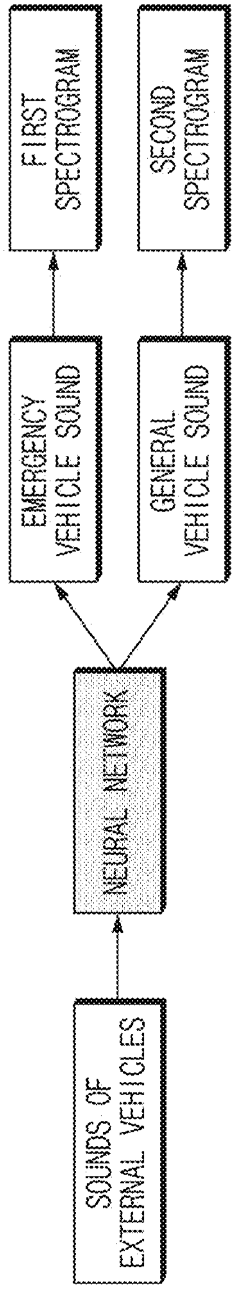
FIG. 5 is a diagram for describing an emergency vehicle detection method through a neural network according to an embodiment of the present disclosure.

FIG. 5 is a diagram for describing a method for detecting emergency vehicle through a neural network according to an embodiment of the present disclosure.

Referring to FIG. 5, a method for detecting an emergency vehicle according to an embodiment of the present disclosure may include detecting an emergency vehicle through a neural network. For example, the method for detecting an emergency vehicle may include detecting emergency vehicle sound and general vehicle sound from the sounds of the external vehicles through the neural network that separates sounds. As a network for separating sound, for example, Wave-U-Net may be used, but embodiments are not limited thereto. In addition, the method for detecting an emergency vehicle may include generating the first spectrogram based on emergency vehicle sound separated from the sounds of external vehicles and generating the second spectrogram based on general vehicle sound separated from the sounds of the external vehicles.

Figure 6:
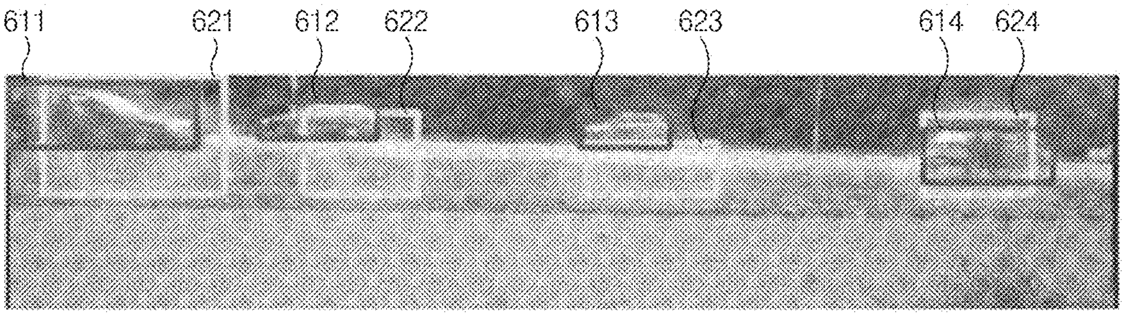
FIG. 6 is a diagram for describing an emergency vehicle detection method according to an embodiment of the present disclosure.

FIG. 6 is a diagram for describing an emergency vehicle detection method according to an embodiment of the present disclosure.

The emergency vehicle detection method according to an embodiment of the present disclosure may include detecting the location of a vehicle based on the sound of the vehicle. Specifically, the emergency vehicle detection method may include detecting the location of the vehicle based on a spectrogram of a vehicle sound. However, as described above, if the location of the vehicle is detected based on the sound of the vehicle, it may be necessary to detect the location of the vehicle by analyzing sound data for each of movement sections of the vehicle in chronological order, causing a latency issue.

Referring to FIG. 6, bounding boxes 611 to 614 are bounding boxes for the actual locations of vehicles, and bounding boxes 621 to 624 may correspond to bounding boxes generated by detecting the locations of the vehicles based on the sounds of the vehicles. Therefore, due to the latency issue described above, the bounding box 621 may not match the bounding box 611, the bounding box 622 may not match the bounding box 612, and the bounding box 623 may not match the bounding box 613, and the bounding box 624 may not match the bounding box 614.

Figure 7:
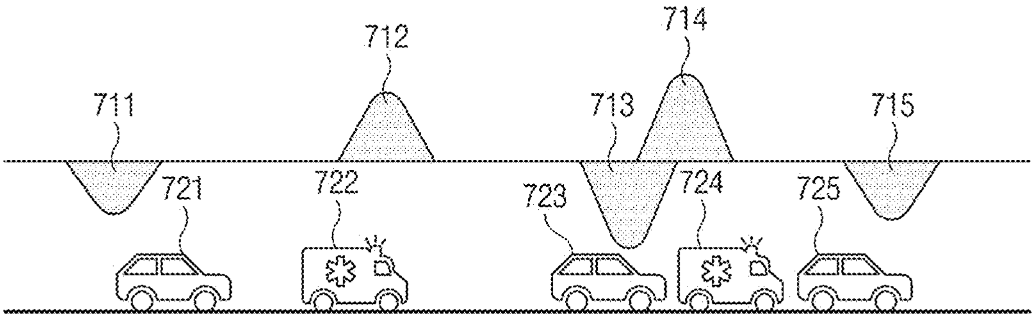
FIG. 7 is a diagram for describing an emergency vehicle detection method according to an embodiment of the present disclosure.

FIG. 7 is a diagram for describing an emergency vehicle detection method according to an embodiment of the present disclosure.

Referring to FIG. 7, an emergency vehicle detection method according to an embodiment of the present disclosure may include Gaussian functions 711 to 715 corresponding to the locations of external vehicles including emergency vehicles 722 and 724 and general vehicles 721, 723, and 725.

For example, the emergency vehicle detection method may include generating the first Gaussian functions 712 and 714 corresponding to the locations of the emergency vehicles based on a first spectrogram for emergency vehicle sound. The emergency vehicle detection method may also include generating the second Gaussian functions 711, 713, and 715 corresponding to the locations of the general vehicles based on a second spectrogram for general vehicle sound. Specifically, the first Gaussian functions 712 and 714 may be a 2D Gaussian functions with positive output values, and the second Gaussian functions 711, 713, and 715 may be a 2D Gaussian functions with negative output values. It should be noted that, for convenience of description, the first Gaussian function and the second Gaussian function are expressed as 1D Gaussian functions in FIG. 7.

As described above, if the location of a vehicle is detected based on sound, a location error may occur. For example, it may be seen that the location of the general vehicle 721 and the location of the second Gaussian function 711 corresponding to the location of the general vehicle 721 do not exactly match each other. In addition, it may be seen that the location of the emergency vehicle 722 and the location of the first Gaussian function 712 corresponding to the location of the emergency vehicle 722 do not exactly match each other. In addition, it may be seen that the location of the general vehicle 723 and the location of the second Gaussian function 713 corresponding to the location of the general vehicle 723 do not exactly match each other. In addition, it may be seen that the location of the emergency vehicle 724 and the location of the first Gaussian function 714 corresponding to the location of the emergency vehicle 724 do not exactly match each other. In addition, it may be seen that the position of the general vehicle 725 and the location of the second Gaussian function 715 corresponding to the location of the general vehicle 725 do not exactly match each other.

Figure 8:
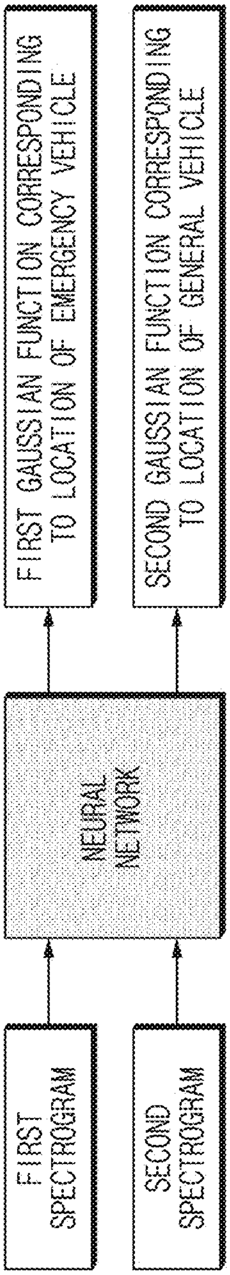
FIG. 8 is a diagram for describing an emergency vehicle detection method through a neural network according to an embodiment of the present disclosure.

FIG. 8 is a diagram for describing an emergency vehicle detection method through a neural network according to an embodiment of the present disclosure.

Referring to FIG. 8, an emergency vehicle detection method according to an embodiment of the present disclosure may include detecting an emergency vehicle through a neural network. For example, the emergency vehicle detection method may include generating a first Gaussian function corresponding to the location of an emergency vehicle based on a first spectrogram. The emergency vehicle detection method may also include generating a second Gaussian function corresponding to the location of a general vehicle based on a second spectrogram, through the neural network that detects the location of an object based on a spectrogram. Specifically, through the neural network, the first Gaussian function corresponding to the location of the emergency vehicle may be generated based on the first spectrogram for emergency vehicle sound, and the second Gaussian function corresponding to the location of the general vehicle may be generated based on the second spectrogram for general vehicle sound. Although not shown in FIG. 8, the neural network may be configured to generate a bounding box corresponding to the location of a vehicle based on a spectrogram. For example, the neural network may be configured to generate a bounding box corresponding to the location of the emergency vehicle based on the first spectrogram. In addition, the neural network may be configured to generate a bounding box corresponding to the location of the general vehicle based on the second spectrogram. In addition, the emergency vehicle detection method may include generating a Gaussian function corresponding to the bounding box. For example, the emergency vehicle detection method may include generating a first Gaussian function based on a bounding box corresponding to the location of the emergency vehicle and generating a second Gaussian function based on a bounding box corresponding to the location of the general vehicle.

As the neural network, for example, EfficientDet may be used, but the neural network is not limited thereto.

Figure 9:
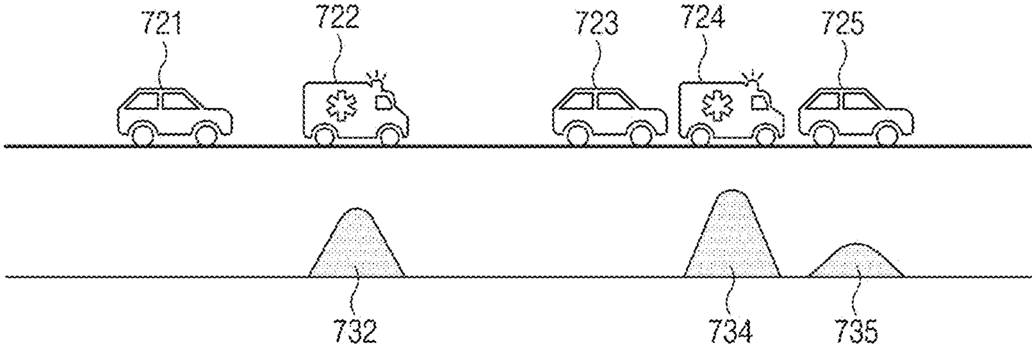
FIG. 9 is a diagram for describing an emergency vehicle detection method according to an embodiment of the present disclosure.

FIG. 9 is a diagram for describing an emergency vehicle detection method according to an embodiment of the present disclosure.

Referring to FIG. 9, the emergency vehicle detection method according to an embodiment of the present disclosure may include generating functions 732, 734, and 735 corresponding to the locations of external vehicles 721 to 725 including the emergency vehicles 722 and 724 and the general vehicles 721, 723, and 725. For example, the emergency vehicle detection method may include acquiring images of the external vehicles 721 to 725 and generating the third Gaussian functions 732, 734, and 735 corresponding to the emergency vehicles 722 and 724 based on the images.

If the location of an object is detected based on an image, the accuracy of location detection may be greater than the accuracy if the location of the object is detected based on sound. Therefore, the location of the emergency vehicle 722 and the location of the third Gaussian function 732 may match each other, the location of the emergency vehicle 724 and the location of the third Gaussian function 734 may also match each other, and the location of the general vehicle 725 and the location of the third Gaussian function 735 may also match each other. It should be noted that, the general vehicle 725 may be determined to be an emergency vehicle and the third Gaussian function 735 may be generated because it is difficult to extract the feature of the emergency vehicle from the image due to differences in the locations of the warning lights of emergency vehicles as described above.

Figure 10:
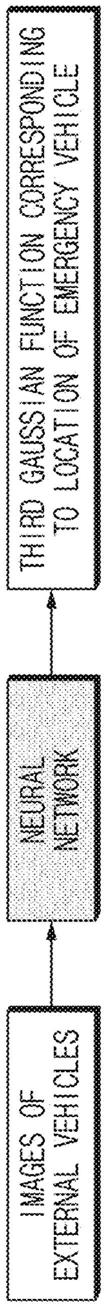
FIG. 10 is a diagram for describing an emergency vehicle detection method through a neural network according to an embodiment of the present disclosure.

FIG. 10 is a diagram illustrating an emergency vehicle detection method through a neural network according to an embodiment of the present disclosure.

Referring to FIG. 10, an emergency vehicle detection method according to an embodiment of the present disclosure may include detecting the location of an emergency vehicle through a neural network. For example, the emergency vehicle detection method may include generating a third Gaussian function corresponding to the location of the emergency vehicle based on the images of external vehicles through a neural network that detects the location of an object based on an image.

The neural network may be, for example, CenterNet, but is not limited thereto.

Figure 11:
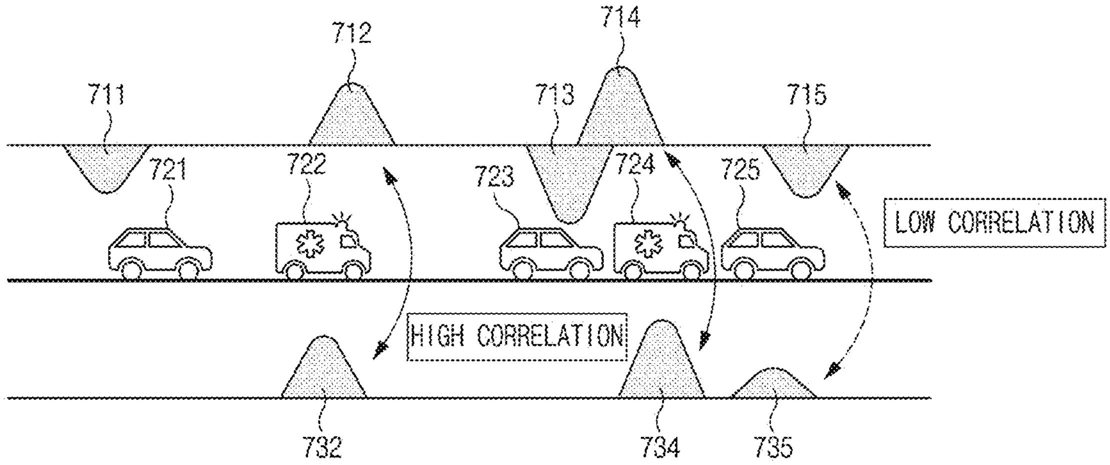
FIG. 11 is a diagram for describing an emergency vehicle detection method according to an embodiment of the present disclosure.
Figure 12:
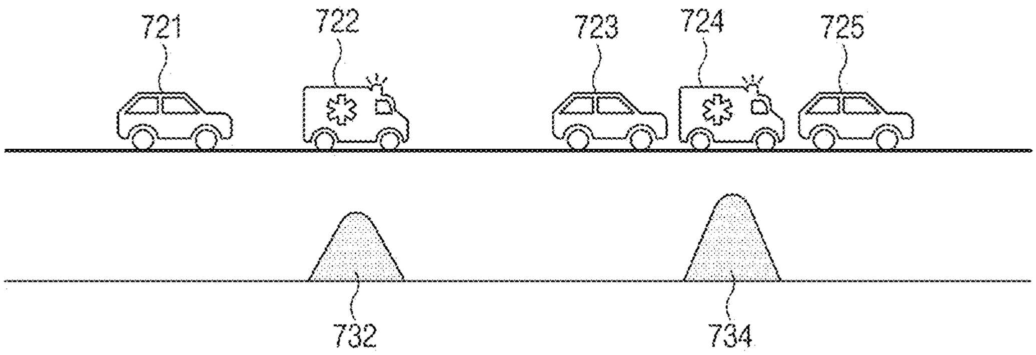
FIG. 12 is a diagram for describing an emergency vehicle detection method according to an embodiment of the present disclosure.

FIG. 11 is a diagram for describing an emergency vehicle detection method according to an embodiment of the present disclosure. FIG. 12 is a diagram for describing an emergency vehicle detection method according to an embodiment of the present disclosure.

Referring to FIGS. 11 and 12, an emergency vehicle detection method according to an embodiment of the present disclosure may include detecting locations of the emergency vehicles 722 and 724 based on a correlation between at least two of the first Gaussian functions 712 and 714, the second Gaussian functions 711, 713, and 715, or the third Gaussian functions 732, 734, and 735. Specifically, the emergency vehicle detection method may include fourth Gaussian functions 732 and 734 whose degree of a correlation between at least two of the third Gaussian functions 732, 734, and 735, the first Gaussian functions 712 and 714, or the second Gaussian functions 711, 713, and 715 is greater than a threshold value. In other words, the emergency vehicle detection method may include detecting the location of the emergency vehicle based on both sound and image through a correlation between at least two of the first Gaussian functions 712 and 714 corresponding to the location of the emergency vehicle generated based on the emergency vehicle sound, the second Gaussian functions 711, 713, and 715 corresponding to the location of the general vehicle generated based on general vehicle sound, or the third Gaussian functions 732, 734, and 735 corresponding to the location of the emergency vehicle generated based on the image.

For example, as shown in FIGS. 11 and 12, the first Gaussian functions 712 and 714 may be Gaussian functions with positive output values, the second Gaussian functions 711, 713, and 715 may be Gaussian functions with negative output values, and the third Gaussian functions 732, 734, and 735 may be Gaussian functions with positive output values.

The degree of correlation between Gaussian functions with positive output values (the first Gaussian function and the third Gaussian function) may be greater than the degree of correlation between a Gaussian function with a positive output value (the third Gaussian function) and a Gaussian function with a negative output value (the second Gaussian function). Therefore, the location of the emergency vehicle may be accurately detected by extracting the fourth Gaussian function 732 or 734 whose degree of a correlation with at least one of the first Gaussian functions 712 and 714 or the second Gaussian functions 711, 713, and 715 is greater than the threshold value, among the third Gaussian functions 732, 734, and 735.

Figure 13:
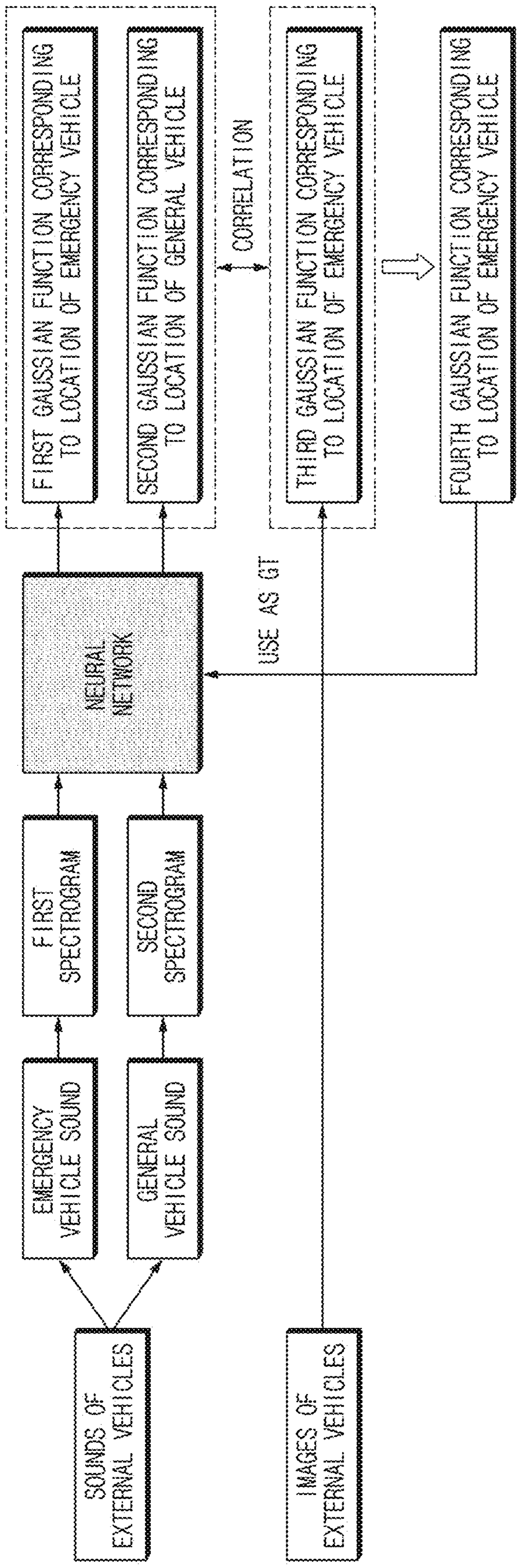
FIG. 13 is a diagram for describing an emergency vehicle detection method through a neural network according to an exemplary embodiment of the present disclosure.

FIG. 13 is a diagram for describing an emergency vehicle detection method through a neural network according to an embodiment of the present disclosure.

Referring to FIG. 13, an emergency vehicle detection method according to an embodiment of the present disclosure may include training a neural network through self-supervised learning.

For example, the emergency vehicle detection method may include acquiring the sounds of external vehicles including emergency vehicles and general vehicles. Additionally, the emergency vehicle detection method may include separating sounds of the external vehicles into emergency vehicle sounds and general vehicle sounds. The emergency vehicle detection method may include generating a Fourier spectrum by performing a 2D FFT on a spectrogram for the sounds of the external vehicles. The emergency vehicle detection method may also include generating a first spectrogram of the emergency vehicle sounds by extracting patterns, which include peak values and are repeated, from the generated Fourier spectrum. In addition, the emergency vehicle detection method may include generating a second spectrogram of the general vehicle sounds based on the Fourier spectrum from which the spectrum caused by the emergency vehicle sounds is removed. For example, the emergency vehicle detection method may include separating the sounds of the external vehicles into the emergency vehicle sounds and the general vehicle sounds through a neural network that separates sounds. The emergency vehicle detection method may also include generating the first spectrogram for the emergency vehicle sounds and the second spectrogram for the general vehicle sounds.

For example, the emergency vehicle detection method may include generating a first Gaussian function corresponding to the location of an emergency vehicle based on a first spectrum, through a neural network that detects the location of an object based on a spectrogram. The emergency vehicle detection method may also include generating a second Gaussian function corresponding to the location of a general vehicle based on a second spectrum, through the neural network that detects the location of the object based on the spectrogram.

In addition, the emergency vehicle detection method may include generating a third Gaussian function corresponding to the location of the emergency vehicle based on the images of external vehicles. The emergency vehicle detection method may include generating a third Gaussian function corresponding to the location of the emergency vehicle based on the images of the external vehicles through a neural network that detects the location of an object based on an image.

The first Gaussian function may be a 2D Gaussian function with a positive output value, the second Gaussian function may be a 2D Gaussian function with a negative output value, and the third Gaussian function may be a 2D Gaussian function with a positive output value, but are limited thereto.

The emergency vehicle detection method may include generating a fourth Gaussian function corresponding to the location of the emergency vehicle based on a correlation between at least two of the first Gaussian function, the second Gaussian function, or the third Gaussian function. Specifically, the emergency vehicle detection method may include extracting a fourth Gaussian function from among the third Gaussian function whose value of a correlation with at least one of the first Gaussian function or the second Gaussian function is greater than a threshold value from the third Gaussian n function. Because both the first Gaussian function and the third Gaussian function have positive output values, the value of a correlation between the two functions may be greater than the threshold value. Because the second Gaussian function and the third Gaussian function are a Gaussian function with negative output values and a Gaussian function with positive output values, respectively, the value of the correlation between the two functions may be less than the threshold value.

The location of the emergency vehicle corresponding to the fourth Gaussian function derived by considering both the sounds of external vehicles and the images of the external vehicles may be more accurate than the location of the emergency vehicle corresponding to the first Gaussian function derived based on the sounds of the external vehicles. Therefore, the data of the fourth Gaussian function corresponding to the location of the emergency vehicle may be the Ground Truth (GT) of a neural network that detects the location of an object based on a spectrogram. Accordingly, the emergency vehicle detection method may include performing self-supervised learning for the neural network by using the location of a vehicle corresponding to the fourth Gaussian function as the GT for the location of the emergency vehicle. The emergency vehicle detection method may increase the prediction accuracy of the neural network that detects the location of a vehicle based on a spectrogram through self-supervised learning for the neural network.

Figure 14:
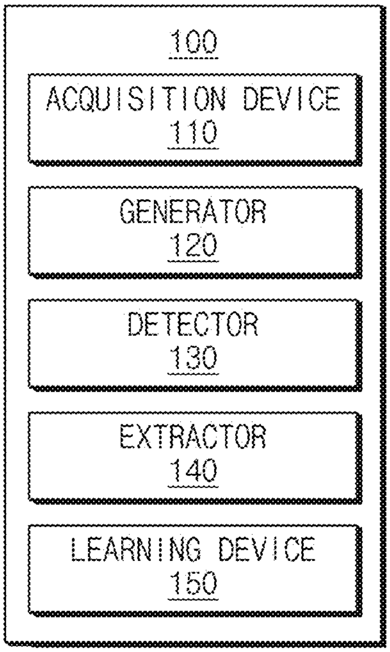
FIG. 14 is a block diagram showing an emergency vehicle detection device according to an embodiment of the present disclosure.

FIG. 14 is a block diagram showing an emergency vehicle detection device according to an embodiment of the present disclosure.

Referring to FIG. 14, an emergency vehicle detection device 100 according to an embodiment of the present disclosure may include an acquisition device 110, a generator 120, a detector 130, an extractor 140, and a learning device 150. The acquisition device 110, the generator 120, the detector 130, the extractor 140, and the learning device 150 may correspond to a processor included in the vehicle. For example, the emergency vehicle detection device may include a memory configured to store computer-executable instructions and at least one processor that accesses the memory to execute the instructions. The at least one processor may control the vehicle detection device using the acquisition device 110, the generator 120, the detector 130, the extractor 140, and the learning device 150.

The acquisition device 110 may be configured to acquire sounds of external vehicles, including emergency vehicles and general vehicles, and to acquire images of the external vehicles.

The generator 120 may be configured to generate a first spectrogram for emergency vehicle sounds and a second spectrogram for general vehicle sounds. In addition, the generator 120 may be configured to generate a first spectrogram and a second spectrogram by detecting emergency vehicle sounds and general vehicle sounds from the sounds of external vehicles through a neural network that separates sounds. The generator 120 may be configured to generate a first Gaussian function corresponding to the location of the emergency vehicle based on the first spectrogram. The generator 120 may be configured to generate a second Gaussian 1 function corresponding to the location of the general vehicle based on the second spectrogram. The generator 120 may be configured to generate a third Gaussian function corresponding to the location of the emergency vehicle based on the images of the external vehicles. The first Gaussian function may be a 2D Gaussian function with a positive output value, the second Gaussian function may be a 2D Gaussian function with a negative output value, and the third Gaussian function may be a 2D Gaussian function with a positive output value. Furthermore, the generator 120 may be configured to generate first Gaussian function the corresponding to the location of the emergency vehicle based on the first spectrogram through a neural network that detects the location of an object based on a spectrogram. The generator 120 may be configured to generate the second Gaussian function corresponding to the location of the emergency vehicle based on the second spectrogram by using a neural network that detects the location of an object based on a spectrogram. The generator 120 may be configured to generate a third spectrogram for the sounds of the external vehicles. The generator 120 may be configured to generate a Fourier spectrum by performing a 2D FFT on the third spectrogram.

The detector 130 may be configured to detect the location of the emergency vehicle based on a correlation between at least two of the first Gaussian function, the second Gaussian function, or the third Gaussian function. The detector 130 may be configured to detect a first spectrum corresponding to emergency vehicle sounds and a second spectrum corresponding to general vehicle sounds from the Fourier spectrum. The detector 130 may be configured to detect the first spectrum by extracting patterns that include peak points and are repeated in the horizontal axis direction from the Fourier spectrum. The detector 130 may be configured to detect the second spectrum from the Fourier spectrum by filtering out the first spectrum.

The generator 120 may be configured to generate a first spectrogram and a second spectrogram by performing an inverse 2D FFT on each of the first spectrum and the second spectrum.

The extractor 140 may be configured to extract, from the third Gaussian functions, a fourth Gaussian function whose value of correlation with at least one of the first Gaussian function or the second Gaussian function is greater than a threshold value.

The detector 130 may be configured to detect the location of the emergency vehicle by determining the location of a vehicle corresponding to the fourth Gaussian function as the location of the emergency vehicle.

The learning device may be configured to perform self-supervised learning for the neural 1 network by using the location of a vehicle corresponding to the fourth Gaussian function as the GT for the location of the emergency vehicle.

Figure 15:
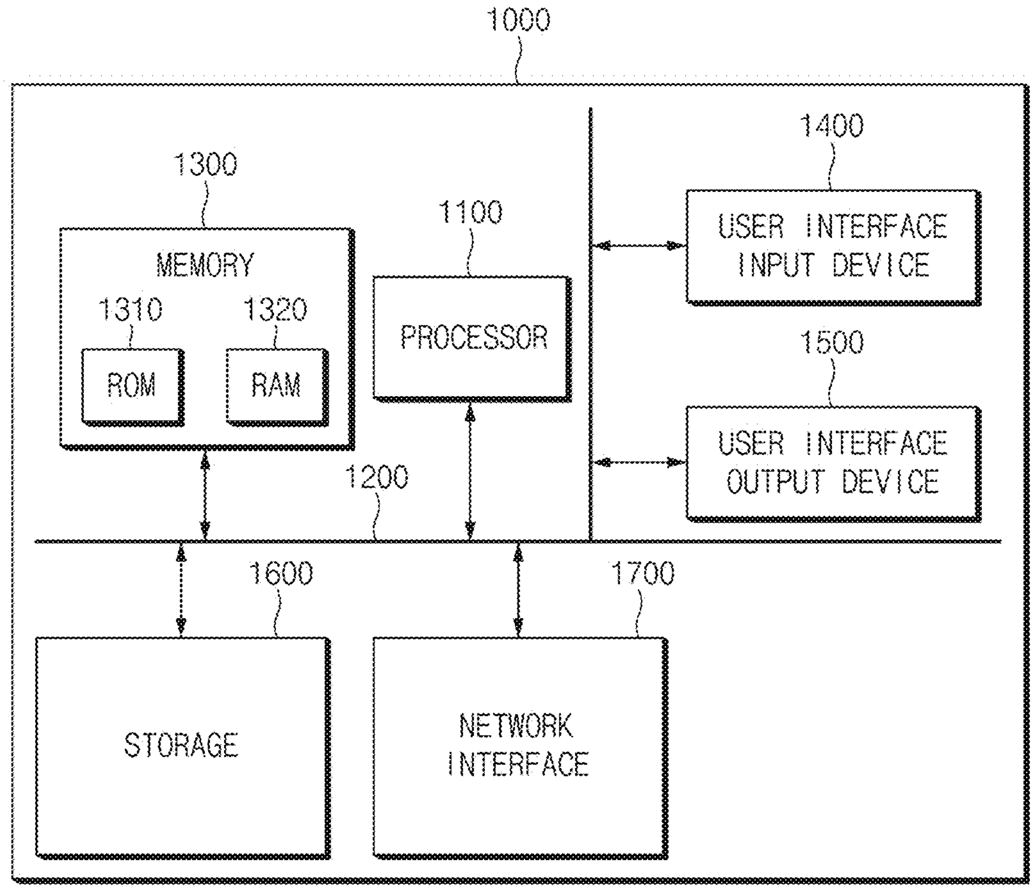
FIG. 15 is a block diagram of a computing system for performing an emergency vehicle detection method according to an embodiment of the present disclosure.

FIG. 15 is a block diagram of a computing system for performing an emergency vehicle detection method according to an embodiment of the present disclosure.

Referring to FIG. 15, a method of determining fail-safe of camera image recognition according to an embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600.

The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

The above description is merely illustrative of the technical idea of the present disclosure, and various modifications and variations may be made without departing from the essential characteristics of the present disclosure by those having ordinary skill in the art to which the present disclosure pertains. Therefore, the embodiments of the present disclosure are provided to explain the spirit and scope of the present disclosure but are not intended to limit the spirit and scope of the present disclosure. Thus, the spirit and scope of the present disclosure is not limited by the embodiments. The scope of protection of the present disclosure should be interpreted according to the following claims, and all technical ideas within the scope equivalent thereto should be construed as being included in the scope of the present disclosure.

According to the object detection method and the object detection device of the present disclosure, it is possible to detect whether an external vehicle is an emergency vehicle based on sound and images.

According to the object detection method and the object detection device of the present disclosure, it is possible to detect the location of an emergency vehicle based on sound and images.

According to the object detection method and the object detection device of the present disclosure, it is possible to detect the location of an emergency vehicle by considering a correlation between at least two of the locations of external vehicles detected based on sound or the location of the emergency vehicle detected based on images.

According to the object detection method and the object detection device of the present disclosure, it is possible to detect the location of an emergency vehicle through a neural network.

According to the object detection method and the object detection device of the present disclosure, it is possible to improve the accuracy of detection of emergency vehicle location through self-supervised learning.

The effects obtainable in the present disclosure are not limited to the aforementioned effects. Any other effects not mentioned herein should be more clearly understood from the following description by those having ordinary skill in the art to which the present disclosure pertains.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure claimed in the following claims.

What is claimed is:

1. An emergency vehicle detection method comprising:

acquiring, by an acquisition device including at least one processor, sounds of external vehicles including an emergency vehicle and a general vehicle;

generating, by a generator including at least one processor, a first spectrogram for an emergency vehicle sound and a second spectrogram for a general vehicle sound;

generating, by the generator, first emergency vehicle location information based on the first spectrogram;

generating, by the generator, general vehicle location information based on the second spectrogram;

acquiring, by the acquisition device, images of the external vehicles;

generating, by the generator, second emergency vehicle location information based on the images of the external vehicles; and detecting, by a detector including at least one processor, a location of the emergency vehicle by generating a numerical correlation value among at least two or more of the first emergency vehicle location information, the general vehicle location information, or the second emergency vehicle location information, extracting a result where the numerical correlation value is greater than a threshold value, and determining the location of the emergency vehicle based on the extracted result.

2. The emergency vehicle detection method of claim 1, wherein generating the first spectrogram and the second spectrogram includes:

generating, by the generator, a third spectrogram for the sounds of the external vehicles;

generating, by the generator, a Fourier spectrum by performing a 2D Fast Fourier Transform (FFT) on the third spectrogram;

detecting, by the detector, a first spectrum corresponding to the emergency vehicle sound and a second spectrum corresponding to the general vehicle sound from the Fourier spectrum; and generating, by the generator, the first spectrogram and the second spectrogram by performing an inverse 2D FFT on each of the first spectrum and the second spectrum.

3. The emergency vehicle detection method of claim 2, wherein detecting the first spectrum and the second spectrum includes:

detecting, by the detector, the first spectrum from the Fourier spectrum by extracting patterns that include peak points and are repeated in a horizontal axis direction; and detecting, by the detector, the second spectrum by filtering out the first spectrum from the Fourier spectrum.

4. The emergency vehicle detection method of claim 1, wherein generating the first spectrogram and the second spectrogram includes generating, by the generator, the first spectrogram and the second spectrogram by detecting the emergency vehicle sound and the general vehicle sound from the sounds of the external vehicles through a neural network that separates sounds.

5. The emergency vehicle detection method of claim 1, wherein generating the first emergency vehicle location information includes generating, by the generator, the first emergency vehicle location information based on the first spectrogram through a neural network configured to detect a location of an object based on a spectrogram.

6. The emergency vehicle detection method of claim 1, wherein the first emergency vehicle location information includes information about a first Gaussian function corresponding to the location of the emergency vehicle, wherein the general vehicle location information includes information about a second Gaussian function corresponding to a location of the general vehicle, and wherein the second emergency vehicle location information includes information about a third Gaussian function corresponding to the location of the emergency vehicle.

7. The emergency vehicle detection method of claim 6, wherein:

the first Gaussian function is a 2D Gaussian function with a positive output value, the second Gaussian function is a 2D Gaussian function with a negative output value, and the third Gaussian function is a 2D Gaussian function with a positive output value.

8. The emergency vehicle detection method of claim 7, wherein detecting the location of the emergency vehicle includes:

extracting, by an extractor including at least one processor, a fourth Gaussian function whose value of a correlation with at least one or more of the first Gaussian function or the second Gaussian function is greater than the threshold value, from among the third Gaussian functions; and detecting, by the detector, the location of the emergency vehicle by determining a location of a vehicle corresponding to the fourth Gaussian function as the location of the emergency vehicle.

9. The emergency vehicle detection method of claim 8, wherein generating the first emergency vehicle location information includes:

generating, by the generator, the first emergency vehicle location information based on the first spectrogram through a neural network configured to detect a location of an object based on a spectrogram; and performing, by a learning device including at least one processor, self-supervised learning on the neural network by using the location of the vehicle corresponding to the fourth Gaussian function as GT (Ground Truth) for the location of the emergency vehicle.

10. The emergency vehicle detection method of claim 1, wherein generating the second emergency vehicle location information includes generating, by the generator, the second emergency vehicle location information based on the images of the external vehicles through a neural network configured to detect a location of an object based on an image.

11. An emergency vehicle detection device comprising:

a memory configured to store computer-executable instructions; and at least one processor configured to access the memory and execute the instructions, acquire, by an acquisition device including at least one processor, sounds of external vehicles including an emergency vehicle and a general vehicle, and images of the external vehicles, generate, by a generator including at least one processor, a first spectrogram for an emergency vehicle sound and a second spectrogram for a general vehicle sound, generate, by the generator, first emergency vehicle location information based on the first spectrogram, generate general vehicle location information based on the second spectrogram, generate, by the generator, second emergency vehicle location information based on the images of the external vehicles, and detect, by a detector including at least one processor, a location of the emergency vehicle by generating a numerical correlation value among at least two or more of the first emergency vehicle location information, the general vehicle location information, or the second emergency vehicle location information, extracting a result where the numerical correlation value is greater than a threshold value, and determining the location of the emergency vehicle based on the extracted result.

12. The emergency vehicle detection device of claim 11, wherein the at least one processor is configured to:

generate, by the generator, a third spectrogram for the sounds of the external vehicles;

generate, by the generator, a Fourier spectrum by performing a 2D Fast Fourier Transform (FFT) on the third spectrogram;

detect, by the detector, a first spectrum corresponding to the emergency vehicle sound and a second spectrum corresponding to the general vehicle sound from the Fourier spectrum; and generate, by the generator, the first spectrogram and the second spectrogram by performing an inverse 2D FFT on each of the first spectrum and the second spectrum.

13. The emergency vehicle detection device of claim 12, wherein the at least one processor is configured to detect, by the detector, the first spectrum from the Fourier spectrum by extracting patterns that include peak points and are repeated in a horizontal axis direction and detect the second spectrum by filtering out the first spectrum from the Fourier spectrum.

14. The emergency vehicle detection device of claim 11, wherein the at least one processor is configured to generate, by the generator, the first spectrogram and the second spectrogram by detecting the emergency vehicle sound and the general vehicle sound from the sounds of the external vehicles by using a neural network that separates sounds.

15. The emergency vehicle detection device of claim 11, wherein the at least one processor is configured to generate, by the generator, the first emergency vehicle location information corresponding to the location of the emergency vehicle based on the first spectrogram by using a neural network configured to detect a location of an object based on a spectrogram.

16. The emergency vehicle detection device of claim 11, wherein:

the first emergency vehicle location information includes information about a first Gaussian function corresponding to the location of the emergency vehicle;

the general vehicle location information includes information about a second Gaussian function corresponding to a location of the general vehicle; and the second emergency vehicle location information includes information about a third Gaussian function corresponding to the location of the emergency vehicle.

17. The emergency vehicle detection device of claim 16, wherein:

the first Gaussian function is a 2D Gaussian function with a positive output value;

the second Gaussian function is a 2D Gaussian function with a negative output value; and the third Gaussian function is a 2D Gaussian function with a positive output value.

18. The emergency vehicle detection device of claim 17, wherein the at least one processor is configured to:

extract, by an extractor including at least one processor, a fourth Gaussian function whose a value of correlation with at least one of the first Gaussian function or the second Gaussian function is greater than the threshold value, from among the third Gaussian functions; and detect, by the detector, the location of the emergency vehicle by determining a location of a vehicle corresponding to the fourth Gaussian function as the location of the emergency vehicle.

19. The emergency vehicle detection device of claim 18, wherein the at least one processor is configured to:

generate, by the generator, the first emergency vehicle location information based on the first spectrogram by using a neural network configured to detect a location of an object based on a spectrogram; and perform, by a learning device including at least one processor, self-supervised learning on the neural network by using the location of the vehicle corresponding to the fourth Gaussian function as GT (Ground Truth) for the location of the emergency vehicle.

20. The emergency vehicle detection device of claim 11, wherein the at least one processor is configured to generate, by the generator, the second emergency vehicle location information based on the images of the external vehicles by using a neural network configured to detect a location of an object based on an image.

* * * * *